Oct. 16, 1923. 1,470,969
M. B. GREENE
METHOD FOR MAKING ARTIFICIAL FLOWERS
Filed Oct. 26, 1921
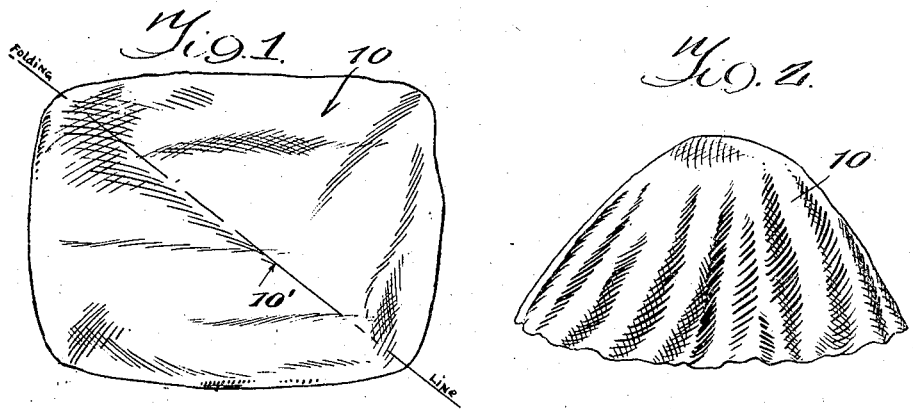
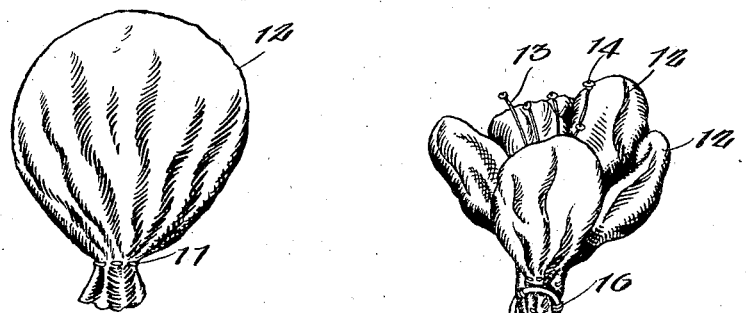
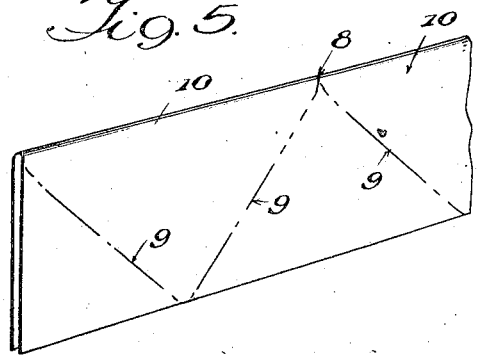
INVENTOR
M. B. GREENE,
ATTORNEYS Patented Oct. 16, 1923.

1,470,969

UNITED STATES PATENT OFFICE.

MARY BEALE GREENE, OF NEW ORLEANS, LOUISIANA.

METHOD FOR MAKING ARTIFICIAL FLOWERS.

Application filed October 26, 1921. Serial No. 510,427.

*To all whom it may concern:*

Be it known that I, MARY B. GREENE, a citizen of the United States, and a resident of New Orleans, in the parish of Orleans and State of Louisiana, have invented certain new and useful Improvements in Methods for Making Artificial Flowers, of which the following is a specification.

This invention relates to a method of making artificial flowers.

The object of the invention is to produce artificial flowers in a simple and inexpensive manner.

It is also an object of the invention that the flowers produced by the present invention shall be an exact reproduction of the natural flowers from which they may be copied.

In carrying out the present invention it is contemplated to form the petals of the flower to be copied of a suitable white cloth and then working into the cloth with the fingers a suitable coloring medium to impart the tint and color of petal desired. The petals are then properly arranged to form the flower and the seedlings and stems therefor are then positioned within the petals and the whole secured together. A stem is then secured to the petals, said stem being preferably of wire or other flexible material and covered with a green fabric so as it may appear as the natural stem.

The invention is exemplified in the accompanying drawings, in which:—

Figure 1 is a perspective view of a blank of fabric adapted for forming a certain size and shape of petal.

Figures 2 and 3 are side elevations showing the next two succeeding steps in forming a petal.

Figure 4 is a perspective view of an artificial flower constructed in accordance with the present invention.

Figure 5 is a plan view illustrating the manner in which the blank of fabric shown in Figure 1 may be cut from a strip of fabric.

Referring to the drawings more particularly, 8 indicates generally a strip of fabric preferably of white organdie to give the petals the required stiffness. The strip is folded upon itself upon a central longitudinal line and then cut upon the full lines 9, and thus forming the blank 10 which when unfolded has the appearance as in Figure 1. The blank 10 is now folded upon the line 10' and then fashioned into the shape shown in Figure 2. The edges are now gathered together as shown in Figure 3 and so secured by threads as indicated at 11 and thus forming the petals 12. Any suitable coloring medium may be now worked into the fabric with the fingers, preferably water color paint is used and the desired tint and shade of the petal being copied is reproduced upon the fabric. A plurality of petals 12 are prepared and then arranged, as shown in Figure 4, and between the petals there is extended a plurality of threads indicated at 13 which are likewise painted to imitate the seedling stems of the flower being copied, and upon the upper ends of these threads there is fashioned or molded from suitable paint the seedlings of the flower as indicated at 14.

The threads 13 which form the seedling stems extend sufficiently between the petals so that they may be secured therewith. The lower ends of the petals are suitably secured together and a loop of wire 15 is secured thereto by threads as indicated at 16. The loop of wire is provided with a green covering so that the same may appear to be the natural stem of the flower. The petals are at this time still wet with the paint which had been previously rubbed into them, and now each petal is molded or curled so that as a whole the artificial flower may be a true reproduction of the natural flower being copied; also at this time additional paint may be applied for shading the petals or the seedling stems 13.

I claim:—

1. The method of forming petals for artificial flowers which consists in fashioning a piece of white fabric of two thicknesses into the shape of a petal being copied, then working into said fabric a water coloring paint until the color and tint of the petal is reproduced, and then shaping the fabric while wet with the paint to correspond to the shape of the petal desired.

2. The method of forming artificial flowers which consists in fashioning each of the petals from a piece of white fabric, then working into the fabric a coloring medium adapted to impart thereto a coloring and tinting of the petals, then securing together the petals so formed, then positioning between said petals a plurality of threads, then painting said threads to correspond with the coloring of the seeding stems of the flower, and then forming on the ends of said threads the seedlings of the flower.

3. The method of forming artificial flowers which consists in providing a blank of white fabric, then gathering the corners thereof together and fashioning a petal therefrom, then working into the fabric a coloring medium adapted to impart thereto a coloring and tinting of petals desired, then securing a plurality of the petals together, then positioning between said petals a plurality of threads, then painting said threads to correspond with the coloring of the seedling stems of the flower, then forming on the ends of said threads the seedlings of the flower, and then molding the petals while still wet with the paint so that as a whole they may resemble the petals of the flowers being reproduced.

4. A method of forming petals for artificial flowers which comprises fashioning a piece of fabric to correspond to the size of the petal to be copied, then working into the fabric with the fingers a substance which is capable of imparting the color or tinting desired for said petal and also capable of imparting a certain stiffness to the fabric and then shaping the fabric with the fingers to correspond to the shape of the petal being copied.

MARY BEALE GREENE.